(12) United States Patent
Edwards

(10) Patent No.: US 7,194,982 B2
(45) Date of Patent: Mar. 27, 2007

(54) LEASH ASSEMBLY WITH BAG ROLL IN HANDLE

(75) Inventor: Timothy Edwards, Del Mar, CA (US)

(73) Assignee: RPG Bags, LLC, Irving, TX (US)

( * ) Notice: Subject to any disclaimer, the term of this patent is extended or adjusted under 35 U.S.C. 154(b) by 29 days.

(21) Appl. No.: 11/007,538

(22) Filed: Dec. 7, 2004

(65) Prior Publication Data

US 2006/0118062 A1 Jun. 8, 2006

(51) Int. Cl.
*A01K 27/00* (2006.01)
(52) U.S. Cl. .................................... 119/796
(58) Field of Classification Search ............ 119/795, 119/796, 797, 794
See application file for complete search history.

(56) References Cited

U.S. PATENT DOCUMENTS

| | | | |
|---|---|---|---|
| 2,652,054 A | 9/1953 | Bishop | |
| 4,095,729 A | 6/1978 | Butera | |
| 4,516,676 A | 5/1985 | Cournoyer | |
| 4,538,727 A | 9/1985 | Solloway | |
| 4,738,385 A | 4/1988 | Bell | |
| 5,050,760 A | 9/1991 | Garcia | |
| 5,064,233 A | 11/1991 | Sloan | |
| 5,135,134 A | 8/1992 | Dancy | |
| 5,265,785 A | 11/1993 | Chudy | |
| 5,363,809 A | 11/1994 | Roe | |
| 5,377,626 A | 1/1995 | Kilsby et al. | |
| 5,441,017 A | 8/1995 | Lindsay | |
| 5,540,469 A | 7/1996 | Albert | |
| 5,611,455 A | 3/1997 | McCreary | |
| 5,680,978 A | 10/1997 | Pinion | |
| 5,727,500 A | 3/1998 | Conboy | |
| 5,819,984 A | 10/1998 | Krueger | |
| 6,019,067 A | 2/2000 | Carey | |
| 6,035,809 A | 3/2000 | Fingerett et al. | |
| 6,073,590 A | 6/2000 | Polding | |
| 6,076,717 A | 6/2000 | Edwards et al. | |
| 6,085,695 A | 7/2000 | Miller et al. | |
| 6,223,695 B1 | 5/2001 | Edwards et al. | |
| 6,240,881 B1 | 6/2001 | Edwards et al. | |
| 6,588,375 B2 * | 7/2003 | Benedettini | 119/795 |
| 2001/0038016 A1* | 11/2001 | Russo | 221/45 |
| 2005/0115520 A1* | 6/2005 | Mancini | 119/796 |

FOREIGN PATENT DOCUMENTS

CA 2292711 * 6/2000

* cited by examiner

*Primary Examiner*—Thomas Price
(74) *Attorney, Agent, or Firm*—Locke Liddell & Sapp, LLP

(57) ABSTRACT

A leash assembly includes a housing including a handle at one end and a leash extendable from and retractable into the housing. The leash assembly further includes a plurality of bags disposed within the handle. The leash assembly also includes a lid permitting access to the handle.

5 Claims, 3 Drawing Sheets

LEASH ASSEMBLY WITH BAG ROLL IN HANDLE

BACKGROUND OF THE INVENTION

The present invention relates in general to leash assemblies and devices for collecting animal litter. More particularly, the present invention relates to a leash assembly incorporating bags into a handle of the leash assembly.

The rapid increase of urban population coupled with the increasing popularity of dogs and other pets has created a serious sanitary problem in connection with the disposal of animal litter, and particular canine litter. Because many animal pet owners have permitted their animals to deposit solid excrement on both private and public property, a number of communities have enacted ordinances requiring pet owners, under penalty of fine, to retrieve and dispose of litter created by their pets.

It has been found that the willingness of pet owners to retrieve and properly dispose of animal litter is related to the ease, convenience and economy with which the litter may be handled in a clean and sanitary manner. While a number of devices have been proposed for the purpose of disposing of animal litter, they have suffered from various shortcomings. Some devices are not completely disposable and, therefore, require some degree of cleanup. Other types of devices, both of the disposable and reusable varieties, are awkward and/or conspicuous to carry. Moreover, some prior animal lifter collection devices are too expensive for everyday use.

One commonly accepted method for collecting and storing animal litter until a proper disposal site can be found involves the use of a disposable plastic bag. Some pet owners will simply place a plastic bag, such as a plastic grocery bag, in a clothing pocket for retrieval when needed. This method of collecting animal lifter presupposes, however, that the pet owner will always have access to and remember to grab a plastic bag prior to walking the pet. There have been proposals to provide devices which would store plastic bags within a container that may be worn by the owner or the pet. Each of these prior devices, however, suffers several disadvantages which the present invention is intended to overcome.

The retractable leash has been gaining popularity for the last twenty years and has taken its place as a permanent pet product. Some have recognized the desirability of providing an easy way to carry pet waste cleanup bags when going for a walk utilizing such a retractable leash. For example, U.S. Pat. No. 5,540,469 discloses a retractable leash placed into an animal waste collecting device which incorporates its own handle, bag holder and flashlight. It is believed, however, that such an assembly involves apparatus and associated costs which are undesirable.

Accordingly, there is a need for a leash assembly which provides access to bags when needed. There is a further need for a leash assembly which incorporates bags into the leash assembly. The present invention fulfills these needs and provides other related advantages.

SUMMARY OF THE INVENTION

The present invention provides a leash assembly which provides access to bags when needed. The present invention further provides a leash assembly which incorporates bags into the leash assembly.

The leash assembly includes a housing having a handle at one end and a leash extendable from and retractable into the housing. The leash assembly further includes a plurality of bags disposed within the handle. The plurality of bags are detachably connected end to end. The bags are also in the form of a roll of bags.

The leash assembly includes a lid permitting access to the handle. The lid includes an aperture and a flexible membrane having slits substantially aligned with the aperture for the removal of bags from the handle through the lid. The lid serves as a removable cap over an open end of the handle.

The handle includes an inner cavity with the bags disposed within the inner cavity. The handle may be of unitary construction with the housing. The lid provides a user with access to the inner cavity and removal of bags from the inner cavity through the lid.

The housing of the leash assembly includes an interior compartment with the leash being extendable and retractable into the interior compartment.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
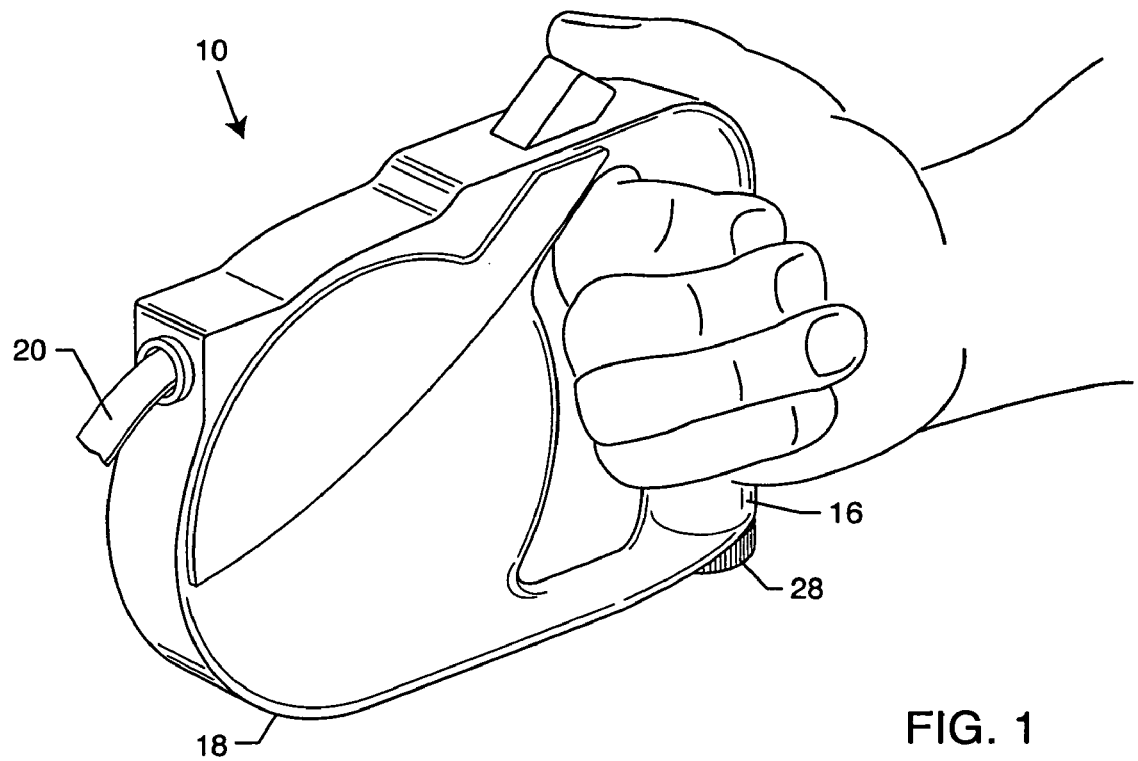
FIG. 1 is a front perspective view of a leash assembly embodying the present invention with a user's hand wrapped around a handle of the leash assembly.
Figure 2:
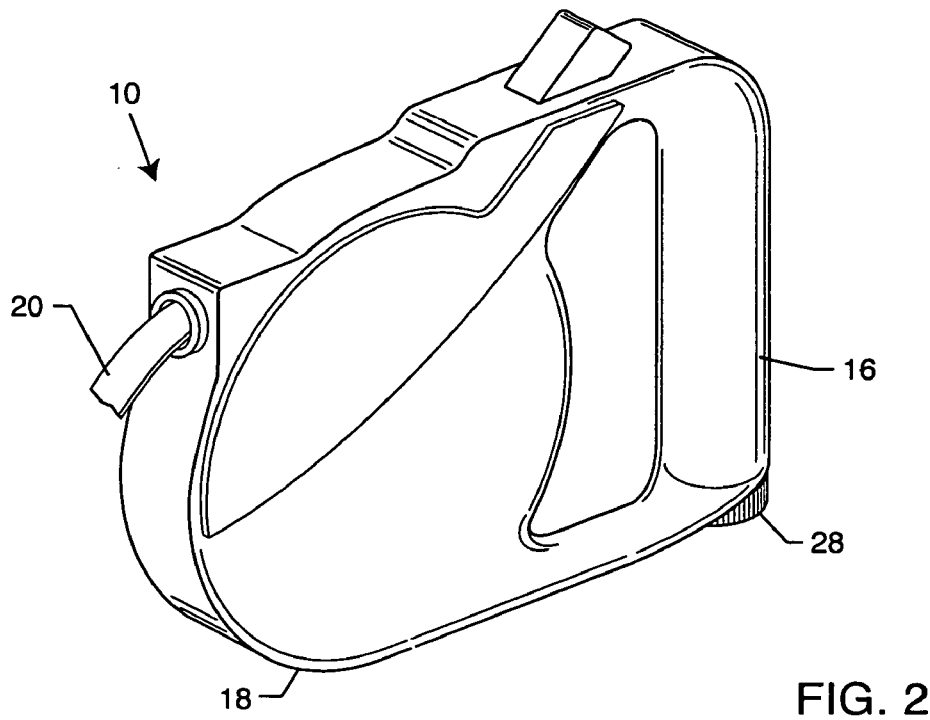
FIG. 2 is another perspective view of the leash assembly of FIG. 1 shown without the user's hand.
Figure 3:
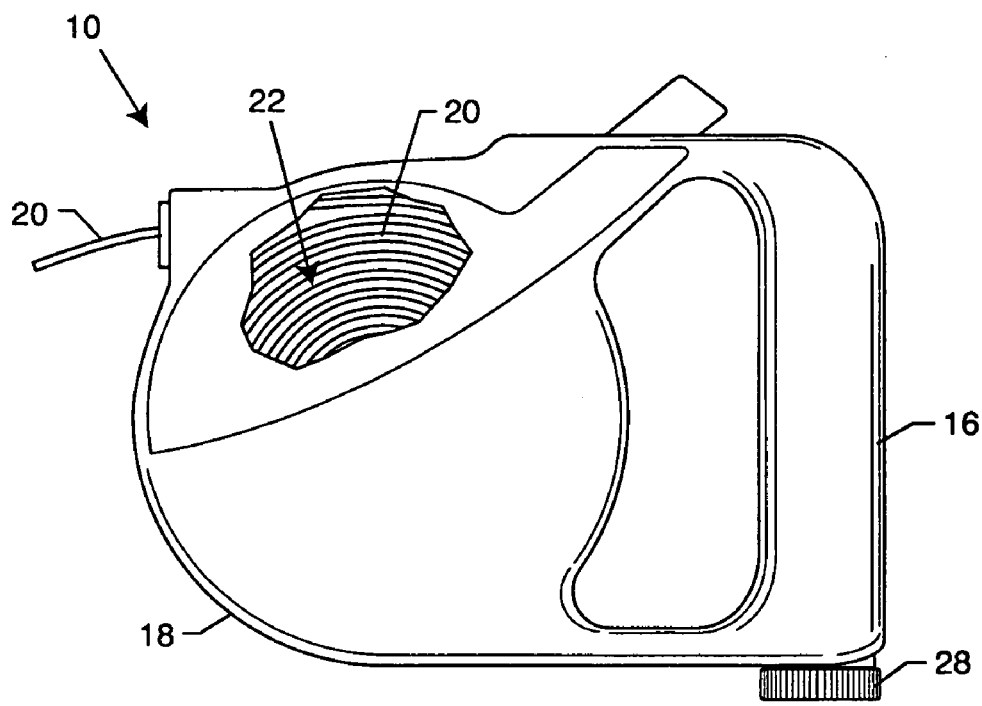
FIG. 3 is a side elevational view of the leash assembly of FIG. 2.
Figure 4:
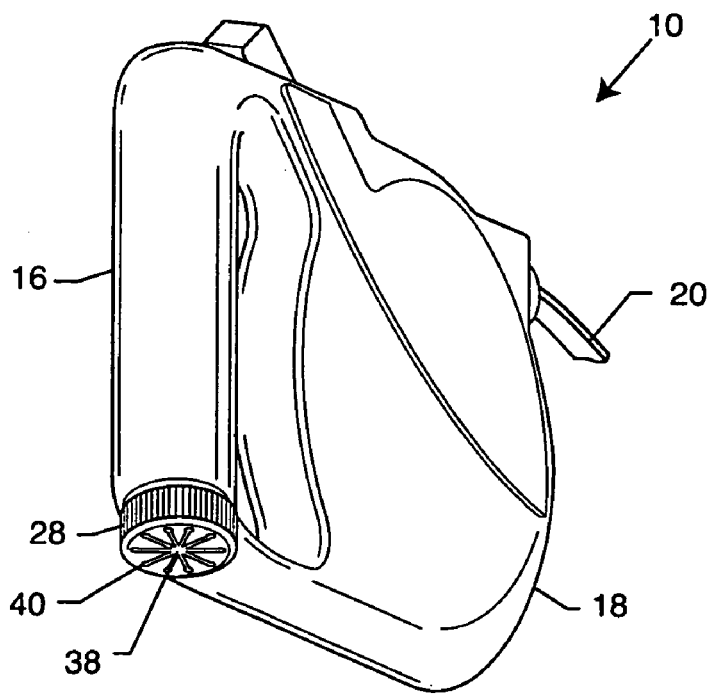
FIG. 4 is a rear perspective view of the leash assembly of FIG. 2.
Figure 5:
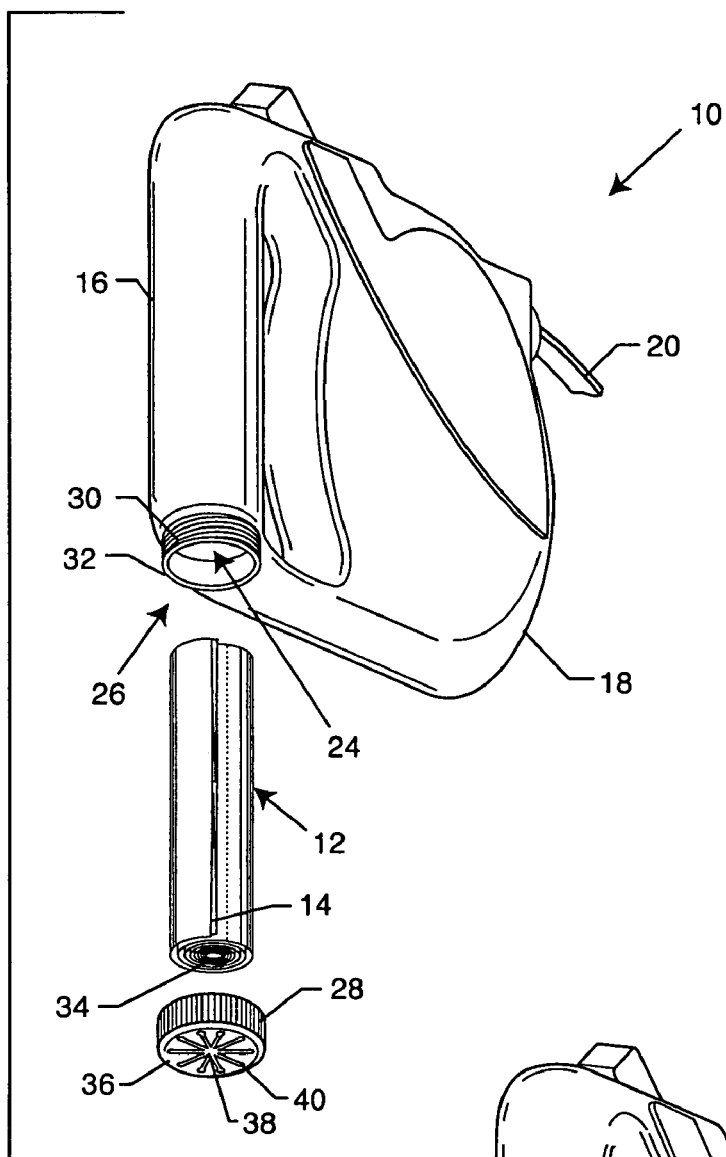
FIG. 5 is an exploded rear perspective view of the leash assembly of FIG. 2 showing the roll of bags and the lid removed from the handle of the leash assembly.
Figure 6:
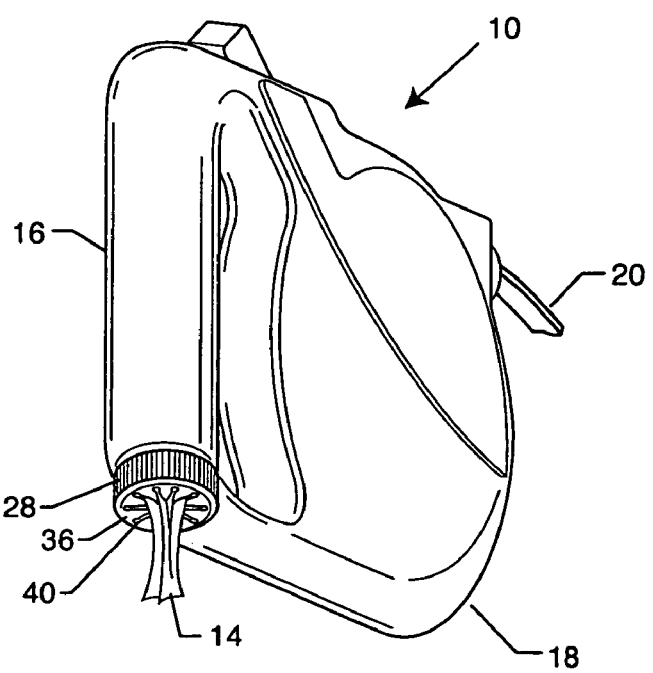
FIG. 6 is a the rear perspective view of FIG. 4 showing a bag partially removed from the leash assembly.

As shown in FIGS. 1–6 for purposes of illustration, the present invention resides in a leash assembly 10 having a roll 12 of bags 14 located in a handle 16 at one end of the leash assembly 10. The leash assembly 10 includes a leash housing 18 from which a retractable leash 20 extends. The leash 20 connects to a collar (not shown), harness (not shown) or the like. The housing 18 includes an interior compartment 22 with the leash 20 being extendable from and retractable into the interior compartment 22. The handle 16 is formed with the leash housing 18 and is of unitary construction with the housing 18. The handle 16 defines an inner cavity 24 for holding therein the roll 12 of a plurality of plastic bags 14 which are connected end-to-end. The roll 12 of plastic bags 14 is disposed within the inner cavity 24 of the handle 16 such that the bags 14 may be individually removed therefrom through an open end 26 of the handle 16. The roll 12 of plastic bags 14 may be inserted into the inner cavity 16 through the open end 26 of the handle 16.

The leash assembly 10 includes a lid 28 which serves as a removable cap for covering over and enclosing the open end 26 of the handle 16. The lid 28 also provides access to the inner cavity 24 of the handle 16. As shown, the interior of the lid 28 is threaded so as to engage threads 30 of a neck 32 of the handle 16. This allows the lid 28 to be connected to the neck 32 of the handle 16. In the alternative, the lid 28 may be designed to snap-fit onto the open end 26 of the handle 16. In another alternative, a cord (not shown) or the like may be interconnected between the lid 28 and the housing 18 so that the lid 28 does not fall to the ground when the lid 28 is removed to install a replacement roll 12 of bags 14.

In use, fifteen or so plastic bags 14 are wound about an axle 34 to form the roll 12. The bags 14 are preferably releasably attached to one another such that one bag 14 may be easily separated from another after being withdrawn from the handle 16, yet the bags 14 are sufficiently attached to one another to prevent such separation as the bags 14 are being withdrawn from the handle 16. The lid 28 may be removed from the handle 16 to place the roll 12 within the inner cavity 24.

The lid 28 includes a flexible membrane 36 which has an aperture 38 therethrough. The membrane 36 includes a number of slits 40, typically in the form of cross-slits, substantially aligned with the aperture 38 for removal of bags 14 from the handle 16 through the membrane 36. The plastic bags 14 are detachably connected to one another and rolled so that once the first bag 14 is removed through the cross-slits 40, the next bag 14 is partially exposed through the lid 28 for easy removal. The flexible membrane 36 is preferably resilient so that the cross-slits 40 somewhat close upon the partially exposed bag 14 to hold the bag 14 in place. In this manner, the next bag 14 of the roll 12 is always partially exposed through the lid 28 until the roll 12 of bags 14 is exhausted. Once exhausted, a new roll 12 of bags 14 is inserted into the inner cavity 24 of the handle 16.

In the alternative, the retractable leash assembly 10 of the present invention can also be configured to incorporate into or otherwise attach a radio, a walkie talkie or a cell phone into the housing 18 of the leash assembly 10. With these configurations a user can listen to music or talk with someone while walking his or her pet. A flashlight can also be incorporated into the leash housing 18, providing light while walking the pet during the dark.

Although an embodiment has been described in detail for purposes of illustration, various modifications may be made without departing from the scope and spirit of the invention.

What is claimed is:

1. A leash assembly, comprising:
   a housing having an interior compartment for receiving a leash, and a manually graspable handle disposed rearwardly of the interior compartment, the graspable handle having an elongated inner cavity with an open end;
   a leash extendable from and retractable into the interior compartment through a forwardly facing opening in the housing that is substantially transverse to the open end of the inner cavity;
   a lid that is releasably attachable to the housing over the open end of the graspable handle, the lid having an aperture that is smaller than the open end of the inner cavity; and
   a plurality of bags maintainable within the inner cavity by the lid, the bags being serially removable from the inner cavity through the aperture without removing the lid.

2. The leash assembly of claim 1, wherein the plurality of bags are detachably connected end to end.

3. The leash assembly of claim 1, wherein the plurality of bags are in a roll of bags.

4. The leash assembly of claim 1, wherein the lid includes a flexible membrane having slits substantially aligned with the aperture for the serial removal of bags from the inner cavity of the handle through the lid.

5. The leash assembly of claim 1, wherein the handle is of unitary construction with the housing.

* * * * *

UNITED STATES PATENT AND TRADEMARK OFFICE
CERTIFICATE OF CORRECTION

| | | |
|---|---|---|
| PATENT NO. | : 7,194,982 B2 | Page 1 of 1 |
| APPLICATION NO. | : 11/007538 | |
| DATED | : March 27, 2007 | |
| INVENTOR(S) | : Timothy Edwards | |

It is certified that error appears in the above-identified patent and that said Letters Patent is hereby corrected as shown below:

In the Specification:

Column 1, line 18, replace "lifter" with --litter--;

Column 1, line 28, replace "lifter" with --litter--; and

Column 1, line 35, replace "lifter" with --litter--.

Signed and Sealed this

Fifth Day of June, 2007

JON W. DUDAS
*Director of the United States Patent and Trademark Office*